US009387940B2

(12) United States Patent
Godzdanker et al.

(10) Patent No.: US 9,387,940 B2
(45) Date of Patent: Jul. 12, 2016

(54) INTELLIGENT SELF-LEVELING DOCKING SYSTEM

(75) Inventors: Roy Godzdanker, Denver, CO (US); Kimon P. Valavanis, Denver, CO (US); Matthew J. Rutherford, Denver, CO (US)

(73) Assignee: Colorado Seminary Which Owns and Operates the University of Denver, Denver, CO (US)

( * ) Notice: Subject to any disclaimer, the term of this patent is extended or adjusted under 35 U.S.C. 154(b) by 365 days.

(21) Appl. No.: 13/991,063

(22) PCT Filed: Nov. 9, 2011

(86) PCT No.: PCT/US2011/060056
§ 371 (c)(1),
(2), (4) Date: Dec. 18, 2013

(87) PCT Pub. No.: WO2012/064891
PCT Pub. Date: May 18, 2012

(65) Prior Publication Data
US 2014/0124621 A1 May 8, 2014

Related U.S. Application Data

(60) Provisional application No. 61/411,635, filed on Nov. 9, 2010.

(51) Int. Cl.
*B64F 1/02* (2006.01)
*B64F 1/12* (2006.01)
*B64F 1/22* (2006.01)
(Continued)

(52) U.S. Cl.
CPC . *B64F 1/12* (2013.01); *B64F 1/125* (2013.01); *B64F 1/22* (2013.01); *B64F 1/28* (2013.01); *E01F 3/00* (2013.01); *B64C 2201/024* (2013.01)

(58) Field of Classification Search
CPC .......................................................... B64F 1/02
USPC .......................................... 244/110 E, 135 A
See application file for complete search history.

(56) References Cited

U.S. PATENT DOCUMENTS

| 4,834,321 A | 5/1989 | Granger | |
| 5,000,398 A * | 3/1991 | Rashev | B64D 5/00 244/110 E |
| 5,092,540 A * | 3/1992 | Burgess | B64F 1/125 114/261 |

(Continued)

FOREIGN PATENT DOCUMENTS

| JP | 9158128 A | 6/1997 |
| JP | 09302628 A | 11/1997 |

*Primary Examiner* — Brian M O'Hara
*Assistant Examiner* — Keith L Dixon
(74) *Attorney, Agent, or Firm* — Holland & Hart LLP

(57) ABSTRACT

A docking system for an unmanned aerial vehicle (UAV) is described that provides a stable landing and take-off area as well as, in some embodiments, refueling and/or data transfer capabilities. The docking system may be portable to provide a ready docking area for a UAV in areas that may not otherwise be suitable for UAV operation. The docking system may include a landing surface, an orientation mechanism that adjusts the landing surface to provide a level landing area, and an alignment mechanism coupled with the landing surface that moves a UAV resting on the landing surface to a predetermined location on the landing surface for automated refueling of the UAV. A latching mechanism may secure the UAV to the landing surface when the UAV is located at the predetermined location.

16 Claims, 8 Drawing Sheets

(51) Int. Cl.
*B64F 1/28* (2006.01)
*E01F 3/00* (2006.01)

(56) References Cited

U.S. PATENT DOCUMENTS

| | | |
|---|---|---|
| 5,248,115 A | 9/1993 | Aurelio |
| 7,410,125 B2 * | 8/2008 | Steele ....................... B64F 1/02 244/110 C |
| 8,162,256 B2 * | 4/2012 | Goossen ............... B64C 39/024 244/110 E |
| 8,297,552 B2 * | 10/2012 | Ying ....................... B64F 1/005 244/110 E |
| 8,485,468 B2 * | 7/2013 | Binnebesel ............. B64F 1/002 244/110 E |
| 2004/0256519 A1 * | 12/2004 | Ellis ....................... B64C 39/024 244/110 E |
| 2007/0228214 A1 | 10/2007 | Horak |
| 2012/0187243 A1 * | 7/2012 | Goldie ................. B64C 39/024 244/110 C |

* cited by examiner

INTELLIGENT SELF-LEVELING DOCKING SYSTEM

CROSS REFERENCE TO RELATED APPLICATIONS

This application is a US National phase of pending application PCT/US2011/060056, filed Nov. 9, 2011, entitled "INTELLIGENT SELF-LEVELING DOCKING SYSTEM," which claims priority to U.S. Provisional Patent Application No. 61/411,635 entitled "INTELLIGENT SELF-LEVELING AND NODAL DOCKING SYSTEM" filed Nov. 9, 2010, and assigned to the assignee hereof and hereby expressly incorporated by reference herein.

FIELD

Embodiments of the present invention generally relate to a robust docking system adapted to receive an unmanned aerial vehicle.

BACKGROUND

Unmanned aerial vehicles (UAVs) are well-known, remotely-operated platforms that may be used for many tasks. UAVs can be relatively small, allowing for relatively small landing and take-off areas, and can have a relatively small radar cross section (RCS) thus allowing operation in potentially dangerous areas with reduced likelihood of detection and without risking a human pilot. Such UAVs are commonly used in remote surveillance or monitoring operations, to obtain intelligence about activity in an area, or monitor the status of assets or people in a particular area. For example, UAVs may be used in intelligence gathering operations at relatively low altitudes in hostile territory. Another exemplary application of a UAV is monitoring operations, such as monitoring of a border between countries or monitoring an asset like a pipeline or convoy which may be targeted by hostile parties. UAVs may be fixed-wing aircraft, or rotary-wing aircraft. Furthermore, UAVs may be operated with reduced requirements for take-off and landing areas. In the case of rotary-wing aircraft, a relatively small and level area is required for take-off and landing operations.

SUMMARY

A docking system for an unmanned aerial vehicle (UAV) is described that provides a stable landing and take-off area as well as, in some embodiments, refueling and/or data transfer capabilities. The docking system may be portable to provide a ready docking area for a UAV in areas that may not otherwise be conducive for UAV operation. In some embodiments, one or more docking systems may be deployed in a service area for one or more UAVs, and act to extend the operating range of the UAVs by providing autonomous docking and refueling of the UAVs at locations remote from personnel operating the UAVs.

In one aspect, a UAV docking apparatus comprises a landing surface, an orientation mechanism coupled with the landing surface configured to adjust the orientation of the landing surface, and an alignment mechanism coupled with the landing surface configured to move a UAV resting on the landing surface to a predetermined location on the landing surface. The orientation mechanism, in an embodiment, adjusts the landing surface to provide a level surface during UAV landing and take-off. The orientation mechanism may include a level sensor and two or more actuators configured to selectively rotate and tilt the landing surface based on feedback from the level sensor. The alignment mechanism, in an embodiment, includes two or more wipers located on the landing surface that move along the landing surface and contact the UAV and move the UAV along the landing surface to the predetermined location. For example, the wipers may contact a skid on an unmanned helicopter to move the helicopter into a position for refueling through a refueling probe in the landing surface. A latching mechanism may secure the UAV to the landing surface when the UAV is moved into the predetermined position. The docking apparatus may also include one or more of: a power source, a compressed air system coupled with each of the orientation and adjustment mechanisms, and a radio system that communicates with the UAV and an operations center. In some embodiments, the landing surface has one or more photovoltaic cells on a side opposite the side used for landing the UAV, and the orientation mechanism can rotate the landing surface to collect solar radiation when not in use by the UAV.

In another aspect, a method for docking an unmanned aerial vehicle (UAV) is provided. The method may include positioning a landing surface to provide a level landing area for a UAV, receiving a signal that the UAV has landed on the landing surface, positioning the UAV in a predetermined area on the landing surface. In some embodiments, the landing surface is positioned based on a signal from a level sensor indicating an orientation of the landing surface relative to a horizontal plane, with two or more linear actuators configured to selectively rotate and tilt the landing surface based on feedback from the level sensor. Positioning the UAV in a predetermined area, in exemplary embodiments, includes actuating one or more wipers coupled with the landing surface to move the UAV on the landing surface to the predetermined area. The method may also include coupling a refueling probe with the UAV, and refueling the UAV.

Another aspect of the present disclosure provides a system for extended operations of one or more unmanned aerial vehicles (UAVs). The system includes a plurality of autonomous docking nodes each comprising a docking apparatus such as described above. The docking apparatuses may be positioned in remote locations of a UAV operating area, with an operating range of the UAVs extended through autonomous docking and refueling remote from personnel supporting the operation of the UAVs.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

A docking system for an unmanned aerial vehicle (UAV) is described that provides a stable landing and take-off area as well as, in some embodiments, refueling and/or data transfer capabilities. The docking system may be portable to provide a ready docking area for a UAV in areas that may not otherwise be conducive for UAV operation. In some embodiments, one or more docking systems may be deployed in a service area for one or more UAVs, and act to extend the operating range of the UAVs by providing autonomous docking and refueling of the UAVs at locations remote from personnel operating the UAVs. In some embodiments, one or more systems are used in conjunction with vertical take-off and landing (VTOL) vehicles (e.g., helicopters). VTOL vehicles are popular for many applications due to their abilities to hover and fly in very low altitudes, and because they do not require a runway for take-off and landing, capabilities that fixed-wing airplanes do not have. The drawback of hovering is that it is energy intensive and one of the reasons that small-scale helicopters have limited flight time compared to similar sized fixed-wing aircrafts.

Figure 1:
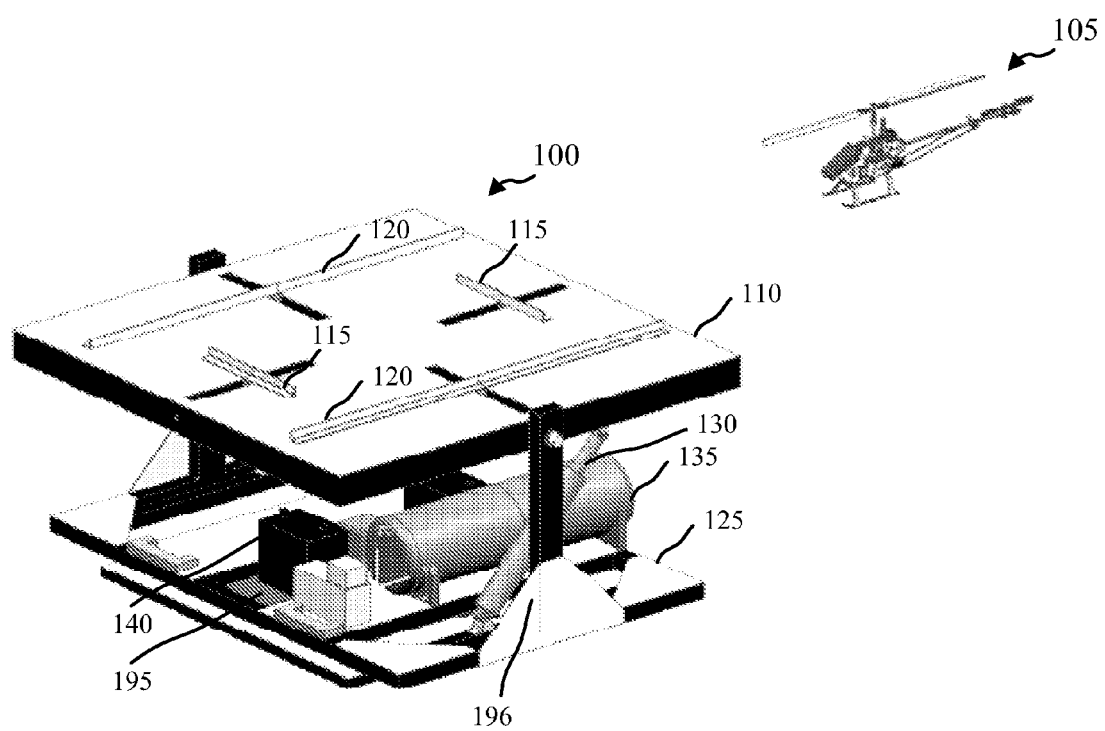
FIG. 1 is an illustration of an exemplary docking apparatus and unmanned helicopter approaching the docking apparatus.

In an exemplary embodiment, illustrated in FIG. 1, a docking node 100 may receive a lightweight unmanned helicopter 105. The docking node 100 includes a general-purpose landing surface 110 where the helicopter 105 may land. When the helicopter 105 is on the landing surface, as will be described in more detail below, the helicopter 105 may be refueled and exchange data with the docking node 100. Such a system may be used in various situations to provide support to the helicopter (also referred to, generally, as an unmanned aerial vehicle or UAV). In many situations, UAV operation (including on-board instrumentation) is limited because such UAVs suffer from relatively short endurance, range, and power. In various embodiments, the docking node 100 may support a load of 150 Kg and be mounted on any stationary location or mobile platform (e.g., car, UGV, sea surface vehicle, etc.). Docking nodes may operate independently of a support base node, maintaining a level landing surface to within operating parameters (such as level within 5 degrees) on ground that is uneven or not level.

In one embodiment, landing surface 110 may be maintained to level within 5 degrees on slopes up to 30 degrees. The docking node 100 may serve as a communication or relay node, powered by batteries charged by solar panels, for example. The use of one or more docking nodes 100 may enhance the endurance and range of UAVs, such as helicopters 105, that may takeoff from one location and land in another, and possibly recharge or refuel. The unmanned, lightweight helicopter 105 may be configurable for multiple missions in civil and public domains incorporating controls for GPS-based navigation and self-stabilization, and may include obstacle avoidance, a flexible communications package (e.g., Zigbee, 802.11, WiFi, etc), and/or a flexible sensor integration system (both mechanical and communications). In one embodiment, the unmanned helicopter 105 may provide the ability to change (plug-in/plug-out) the engine and onboard sensors based on mission characteristics. Mechanically, the docking node 100 of this embodiment includes an automated centering mechanism that includes wipers 115 and 120 that contact the skids of helicopter 105 and center the helicopter 105 in a predetermined location on the landing surface 110. A latching system may secure the helicopter 105 to the landing surface 110, such as through a hook that extends from the landing surface 110 over each skid of the helicopter 105. The latching system may effectively secure the helicopter 105 to the landing surface 110 allowing for other subsystems, such as a recharging or refueling system to connect to the helicopter 105. Electrically, docking node 100 and helicopter 105 are integrated to support recharging, and computationally, the two components may be able to relay data and new mission parameters in both directions.

The landing surface 110 is mounted to a base 125, and includes a leveling actuator 130 to tilt the landing surface 110 such that the surface is level and provides a suitable landing surface 110 for helicopter 105. In one embodiment, the docking node 100 may be rotated such that the combination of rotation and tilting of landing surface 110 provides a level surface. In the embodiment of FIG. 1, the docking node 100 also includes a compressed air system including air reservoir 135 that may be used to actuate pneumatic actuators for the centering, leveling, and/or latching systems. A control module 140 may provide control and communications for the docking node 100, including control for the centering, leveling, and/or latching systems, and may also include wireless communications systems for transmitting data between a helicopter 110, other docking nodes 100, and/or remote operations centers or a support base node. In one embodiment, the bottom side of landing surface 110 includes solar panels that may be used to recharge the docking node 100 when not in use by the helicopter 105.

In various embodiments, docking node 100 and helicopter 105 are designed as a system that may be used to remove current barriers related to unmanned systems technology, allowing for complex missions requiring prolonged endurance, long range, power/energy demands, also enabling research projects in advanced navigation and control systems, robustness and fault tolerance, emergency landing controllers, vision-guided emergency landing, secure data transmission, improved performance both hardware- and software-wise. The use of such a system may enhance endurance and range of UAVs, allowing, for example, helicopters (electric or not) may take-off from one location, land in another, and possibly recharge or refuel. Such systems have many applications, such as surveillance, reconnaissance, border patrol, traffic monitoring, emergency response, agricultural spraying, battlefield surveillance, hot-spot detection after forest fires, port monitoring, oil/gas pipeline inspection, search and rescue, and other applications that require an "eye in the sky" perspective. Vertical take-off and landing (VTOL) vehicles are popular for these applications due to their abilities to hover and fly in very low altitudes, and because they do not require a runway for take-off and landing, capabilities that fixed-wing airplanes do not have. The drawback of hovering is that it is energy intensive and one of the reasons that small-scale helicopters have limited flight time compared to similar sized fixed-wing aircrafts. By strategically placing recharging/refueling stations (i.e., docking nodes 100) in the work field of the helicopter, a doubling (or more) of the mission range/time is possible, since no batteries must be held in reserve for the return flight to a base node. Additionally, docking nodes 100 may operate as part of a larger, wireless, sensor network. Data collected on-board the unmanned helicopter must eventually reach a human operator in a Ground Control Station (GCS), Airborne Station, or other location, for intelligent decision-making. By using docking nodes 100 and deploying unmanned helicopters 105 for complicated missions far away from a human operator, a transmission range limitation arises. Because small-scale helicopters have limited payload capabilities they commonly cannot carry powerful transmitters on-board to directly transmit data to the GCS. To overcome this limitation, in various embodiments the helicopters 105 are equipped with a smaller, lightweight transmitter that is capable of reaching a docking node 100, which does not have a payload limitation. Onboard the docking node 100, a more powerful transmitter acts as a relay point for information between the helicopter 105 and the GCS.

Figure 2:
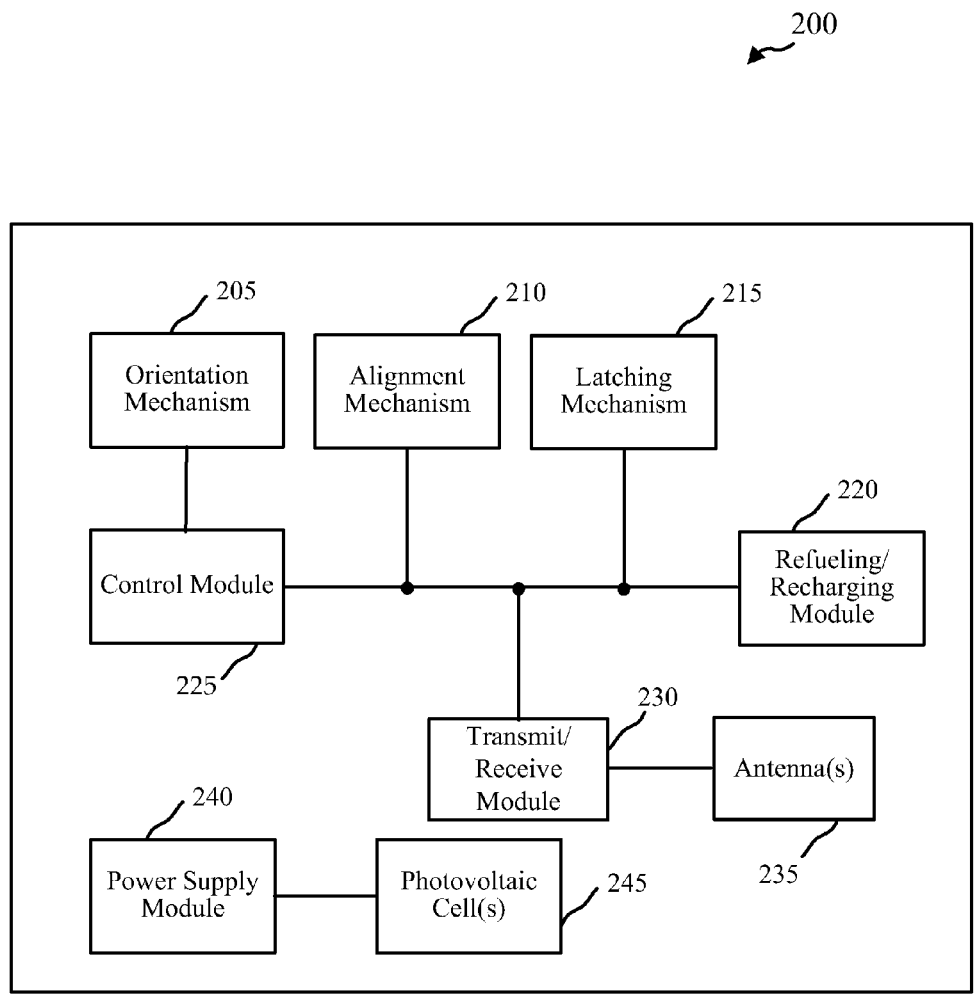
FIG. 2 is a block diagram of the operational modules included in an exemplary docking apparatus.

With reference now to FIG. 2, a block diagram illustration of a docking node 200 is described. In this embodiment, docking node 200 includes an orientation mechanism 205, an alignment mechanism 210, a latching mechanism 215, and a refueling/recharging module 220. A control module 225 is interconnected to each of the orientation, alignment, and latching mechanisms 205, 210, 215, and the refueling module 220, and controls the operation of each. The control module 225, in this embodiment, is also connected to a transmit/receive module 230, which is in turn coupled with one or more antennas 235. The docking node 200 in this embodiment also includes a power supply module 240 that is coupled with one or more photovoltaic cells 245, which provide operating power to each of the components of the docking node 200.

The orientation mechanism 205, in an embodiment, includes components that operate to provide a level landing surface for the docking node 200. In some embodiments, the orientation mechanism includes a level sensor detects landing surface orientation relative to a horizontal plane. If the landing surface is not sufficiently level, that is, one part of the landing surface has a higher elevation than other parts of the landing surface, the orientation mechanism 205 adjusts the orientation of the landing surface to provide a sufficiently level surface. The level sensor may include one or more of a number of different sensors that can be used to determine the orientation of the landing surface, such as one or more accelerometers, gyroscopes, piezoelectric sensors, tilt sensors, etc. In one embodiment, a two-axis accelerometer is used to determine that the landing surface is sufficiently level. The level sensor may be coupled with a controller either internal to the orientation mechanism 205, or to the control module 225, which may receive the output of the level sensor and make necessary changes to the orientation to the landing surface. In some embodiments, one or more filters are coupled with the level sensor(s) to filter out relatively high-frequency noise, such as vibrations that may be present in the area of the docking node 200. The filtered output is then used as a basis for making any necessary physical adjustments to the landing surface. The orientation mechanism 205 also includes physical components that act to rotate and/or tilt the landing surface, under control of the control module 225 (or a controller internal to the orientation mechanism 205) to provide a surface that is sufficiently level to support landing and take-off of an associated UAV. In one embodiment, the physical components include linear actuators coupled with the landing surface that act to rotate the landing surface about a vertical axis, and to tilt the landing surface about a horizontal axis. In one embodiment, the linear actuators are pneumatic linear actuators, and the power supply module 240 includes a compressed air module (including compressed air storage and/or an air compressor). In other embodiments, the linear actuators are electronic actuators. Of course, any of a number of mechanical components may be used to adjust the orientation of the landing surface, as will be readily recognized by one of skill in the art.

The alignment mechanism 210, in an embodiment, includes components that operate to move a UAV, once the UAV is resting on the landing surface, to a desired position. For example, a refueling or recharging probe may extend from the landing surface at a particular location, and the UAV upon initially landing on the landing surface may not aligned to receive the probe. The alignment mechanism 210 moves the UAV on the landing surface such that the UAV is located at the proper location for alignment with such a probe. In one embodiment, the alignment mechanism 210 includes wipers located on the landing surface. When a UAV lands on the landing surface, the UAV may send a signal to the control module (such as through antenna(s) 235 and transmit/receive module 230) indicating that the UAV has landed and is no longer moving. Upon receipt of this signal, the control module 225 may actuate alignment mechanism 210 to move the wipers, and thus the UAV, to the proper location on the landing surface. Wipers may be coupled with linear actuators, such as pneumatic or electronic actuators, that drive an associated wiper across the landing surface and thereby move the UAV into proper alignment on the surface. For example, the wipers may contact the skids of an unmanned helicopter to properly align and move the helicopter into position to be coupled with a refueling or recharging probe. As mentioned above, power supply module 240 may provide the energy required to operate the linear actuators. Of course, any of a number of mechanical and/or electrical components may be used to adjust the alignment of a UAV located on the landing surface, as will be readily recognized by one of skill in the art. Once the UAV is properly aligned, latching mechanism 215 is actuated to secure the UAV to the landing surface. In one example, latching mechanism is a pair of hooks that are moved over the skids of an unmanned helicopter to secure the helicopter to the landing surface. The latching mechanism may be coupled with pneumatic or electronic actuators that work to move the latching mechanism into proper position to secure the UAV to the landing surface.

Refueling/recharging module 220, as mentioned above, may include a refueling or recharging probe that extends from the landing surface to a receiver on the UAV, and may refuel or recharge the UAV. In some embodiments, such a probe may also include a data connection to transfer data from one or more sensors (e.g., infrared, video, and/or positioning sensors such as a GPS sensor) of the UAV to the docking node 200, for further transmission to necessary users of such data. On other embodiments, the refueling/recharging module 220 may include an arm that extends to unlatch and remove a battery pack from the UAV, and replace the spent battery pack with a charged battery pack, thus reducing the time that the UAV is required to spend on the landing surface prior to taking off again. The removed battery pack may then be placed in a recharging cradle located below the landing surface, for example. Transmit/receive module 230 may include any of a number of radio transmitters and operate to provide communications over any appropriate wireless connection, such as Zigbee, 802.11, WiFi, cellular communications, etc. Transmit/receive module 230 may also include a connection to one or more wired communications connections. Power supply module 240 may include a suitable power supply, such as a connection to an external power supply, an internal power supply such as a battery pack or generator, etc. In the embodiment of FIG. 2, photovoltaic cell(s) 245 are coupled with power supply module 240, and provide the ability to recharge or obtain operating power through the photovoltaic cell(s) 245. In one embodiment, the photovoltaic cell(s) 245 are located on an underside of the landing surface, and the orientation mechanism 205 flips the landing surface over when not in use by a UAV to expose the photovoltaic cell(s) 245 to solar radiation. Orientation mechanism may also provide sun tracking to provide improved efficiency for the photovoltaic cell(s).

Systems such as described herein may thus provide a safe landing platform, level to the environment that may be deployed in UAV operating spaces. With reference now to FIGS. 3-6, exemplary docking node 100 is described in more detail. As mentioned above, the docking node 100 includes a landing surface 110 that provides a level area for landing and take-off of a UAV. To achieve this functionality, a minimum of two degrees of freedom (DOF) are necessary in the landing surface 110. One to rotate the landing surface 110 platform to align with the gradient and the other to level the landing surface 110 to the gradient. In one embodiment, best viewed in FIGS. 3, 4, and 6, a combination of pneumatics and DC motors are used to achieve the leveling. Pneumatic actuators 130 and DC motor 145 act to tilt and rotate landing surface 110 to the appropriate orientation. FIG. 5 illustrates components of the centering and latching mechanisms for this embodiment. Wipers 115, 120, are moved through DC motors 150 and linear actuators 155. Latches 160 are rotated over skids on a helicopter 105 when the helicopter is located on the landing surface 110.

In some embodiments, the objects/components of docking node 100 include (1) aluminum or other metal alloys that make up the frame of the bottom subassembly and landing surface 110 subassembly, (2) a pneumatic system including air reservoir 135, pneumatic actuators 130 and valves to actuate the landing surface 110, (3) a direct current (DC) motor 145 that rotates the landing surface 110 to align it with the gradient, (4) another set of DC motors 150 to drive the centering and latching mechanism of the helicopter. All of these objects work together to operate the docking node 100, and are controlled by an on-board computer system 140, in an embodiment. Additionally, docking node 100 may function either as a standalone unit or it can be integrated with other unmanned systems, such as ground or sea surface vehicles.

The mechanical system associated with leveling the landing surface 110 includes two linear actuators 130 that are mounted in opposite directions. These actuators 130 are responsible for leveling the landing surface 110 to account for the gradient or slope of the background environment. An additional rotary actuator 145 is used to rotate the entire landing surface on a turntable bearing 165 through a gear train 170 to align landing surface 110 with the gradient. Hence, leveling is achieved through linear and rotary actuators.

Once the landing surface 110 is level and the helicopter has landed, the recharging and data exchange processes can take place. In order to perform these tasks, the orientation of the helicopter with respect to landing surface 110 must be known. To position the helicopter 105 to a known location, linear actuators 155 to which metal wipers 115, 120 are attached, move the helicopter to a pre-determined location on the landing surface 110. In one embodiment, actuators 155 comprise an acme thread shaft that is rotated by DC motor 150. This is done to account for the error associated with autonomous helicopters 105 landing procedures. Once the helicopter 105 has been moved to the predefined location on the landing surface 110, two latching motors 160 may engage and connect to the helicopter skids. These latching mechanism are one location where the connection between the landing surface 110 and helicopter 105 can be made for the purpose of recharging and data exchange.

All of these tasks are performed under the control of a control module 140 that receives input through several sensors. The leveling is performed through input of tilt sensors 175, while the centering is done by a pre-determined algorithm controlled by proximity sensors 180 for the wipers. The control module 140 will additionally interact with the necessary charge controllers for recharging the batteries onboard the helicopter 105. Finally the control module 140 will also interact with an on board transmit/receive module to relay the data from the helicopter 105 to a human operator. This control module 140 is housed, in this embodiment, in a weatherized container onboard docking node 100.

Figure 3:
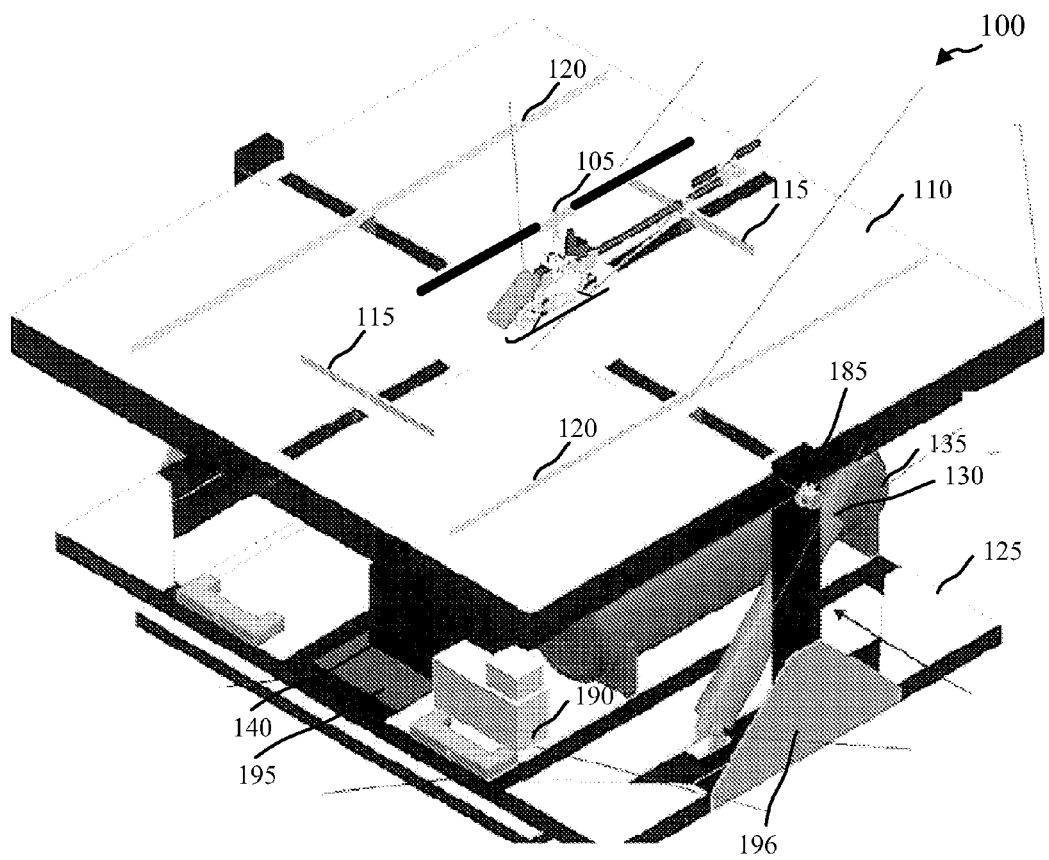
FIG. 3 is a perspective illustration of an exemplary docking apparatus.

FIG. 3 shows a 3-D oblique view of docking node 100 with helicopter 105 on the landing surface 110 with the long centering wipers 120 and short centering wipers 115 in the 50% retracted position. In this Figure, both the long and short centering wipers 120, 115, are attached to the landing surface 110. The landing surface 110 is rotated to level by linear actuator 130. The landing surface 110 pivots on a pin 185. To reduce friction, the landing surface 110 pivot pin 185 rides inside a bearing, in this exemplary embodiment. The visible components on the underside of landing surface 110 illustrated in FIG. 3 include an air compressor 190 to power the pneumatic linear actuators 130. The air compressor 190 stores the compressed air in an air reservoir 135. The air coming out of the air reservoir 135 is throttled through a 3-way valve. The pneumatic linear actuator 130 is controlled by pressure inside each of the cylinder halves and this pressure is varied by the valve. The valve used in this embodiment of docking node 100 is a solenoid valve. The solenoid valve and other electrical components on docking node 100 get their power from a battery 195.

Figure 4:
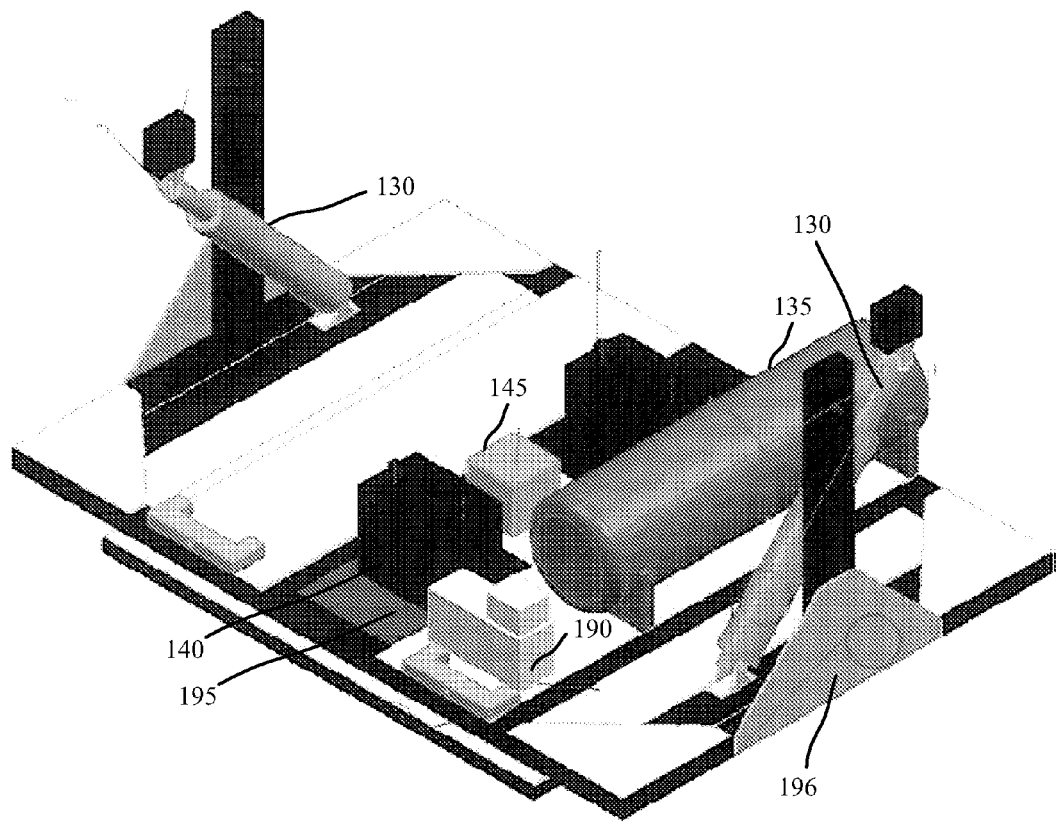
FIG. 4 is an illustration of an exemplary landing surface and components used in leveling the landing surface.
Figure 5:
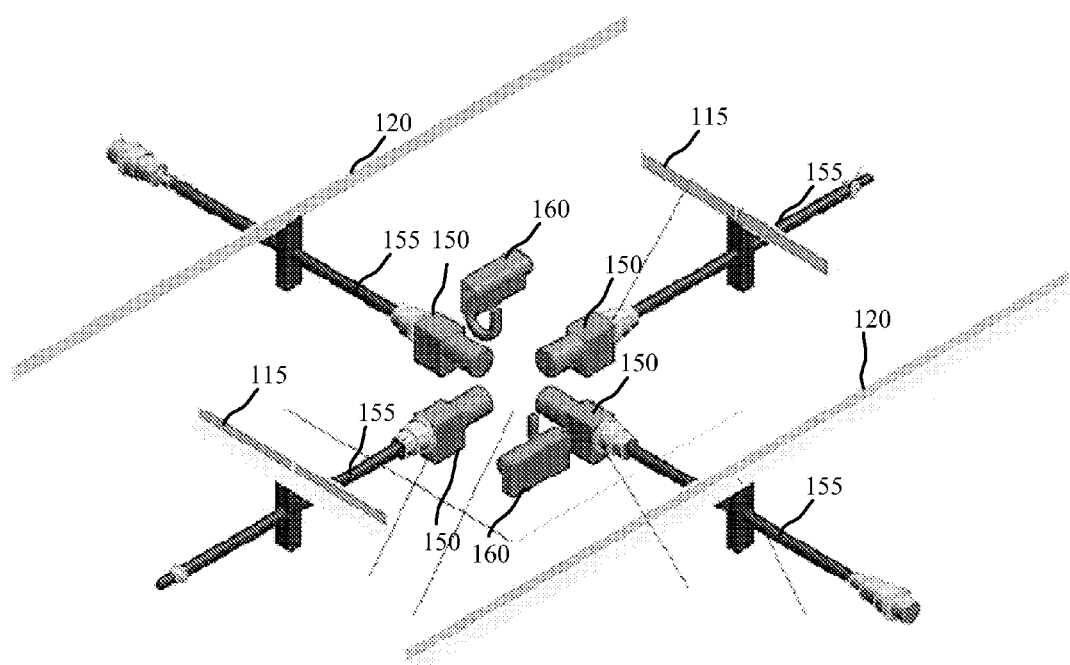
FIG. 5 is an illustration of an exemplary landing surface and components used in centering a UAV on the landing surface.

FIG. 4 is another 3-D oblique view of docking node 100 with the landing surface 110 removed to show some of the additional components. The second actuator 130 is mounted mirrored and opposite to the first actuator 130 shown in FIG. 3. These actuators 130 are attached to the base of docking node 100 by a pivot bracket 196. Pivot bracket 196 is also used to attach the actuator 130 to the landing surface 110. Additionally FIG. 4 shows the motor 145 used to rotate docking node 100 to align with the gradient before leveling to the gradient with the actuators 130.

Figure 6:
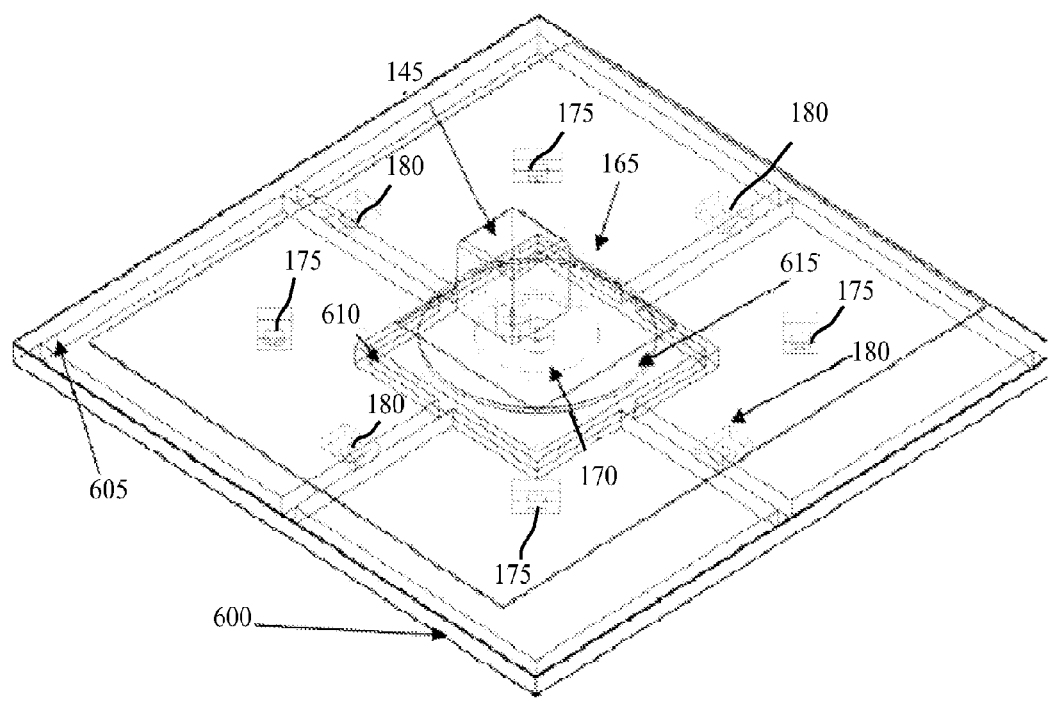
FIG. 6 is an illustration of an exemplary bottom surface of a docking apparatus and components used in rotating the landing surface.

FIG. 6 shows the components necessary to produce the rotation for alignment with the environment gradient. The rotation is achieved by an electric motor 145 powered by the batteries 195. The entire rotation assembly is a "sandwich" which will be described in layers from the surface touching the ground up through the top of the substructure. The lowest part of the assembly is the base 600 which is a rigid frame bolted onto any system such as an autonomous ground or sea surface vehicle. On top of the base a thin smooth sheet 605 is attached. At the center of the base 600 there is a square to which the bottom half of the turntable bearing bracket 610 is attached. The bottom turntable bearing bracket 610, in this embodiment, is a square plate the size of the center square in the base 600 and one half the thicknesses of the gears 170 used. The turntable bearing 615 is attached to the bottom half of the turntable bearing bracket 610. Turntable bracket 165 is attached to the top of the turntable bearing 615 using the same construction as the bottom turntable 610 bracket. In the pocket formed by the two turntable brackets 610 and 165 and the turntable bearing 615, two gears 170 rotate. One gear is attached to the bottom turntable bracket 610 and is bolted. The other gear 170 is attached to the motor 145 rotating around the fixed gear 170. Another thin sheet is attached to the top of the turntable bracket 165, which forms the bottom of the middle rotating sub assembly. The motor 145 is attached to the top of the thin plate thereby completing the sandwich and allowing rotation of docking node 100 for alignment with the gradient of the environment.

It will be readily understood that numerous design options exist for construction of docking node 100. For example, landing surface 110 may be constructed from aluminum or something other than aluminum, such as, for example, titanium. The centering mechanism may be implemented using acme screws and DC motors, which could be replaced by rodless air cylinders to take advantage of the existing air system integrated with docking node 100. Alternatively, the centering acme screws can be replaced by DC linear actuators. The two air pistons can be replaced by hydraulics or other suitable actuators. Similarly to the landing surface 110, the entire bottom substructure could be constructed of other alloys such as titanium instead of the exemplary aluminum.

Figure 7:
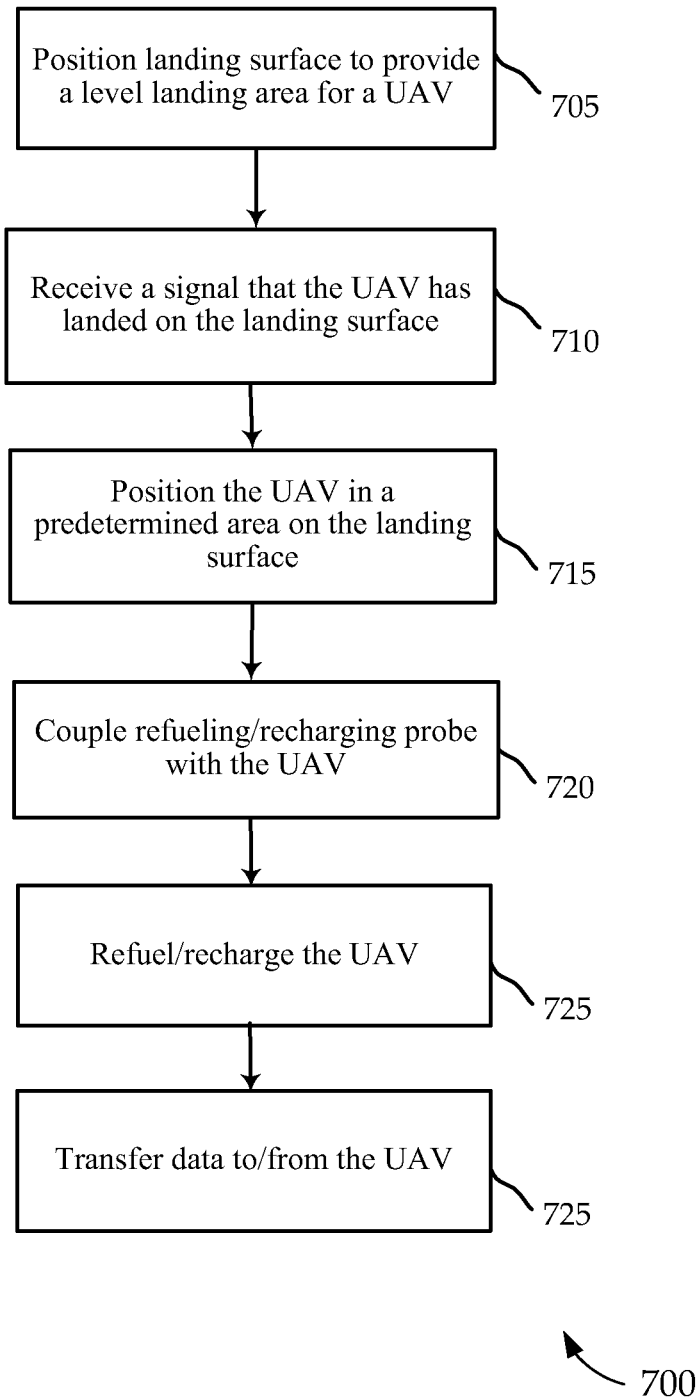
FIG. 7 is a flow chart illustration of exemplary operational steps for autonomous docking of a UAV according to an embodiment.

With reference now to FIG. 7, an exemplary method according to an embodiment is described. In this embodiment, a landing surface on a docking node is positioned to provide a level landing surface for a UAV, as indicated at block 705. A signal is received from the UAV indicating that the UAV has landed on the landing surface, according to block 710. Such a signal may be wirelessly transmitted through radio frequency transmission, optical, or acoustic transmission or may instead originate from contact sensors mounted on the landing surface. At block 715, the UAV is positioned in a predetermined area on the landing surface. Positioning may be done, for example, through moving one or more wipers along the landing surface and sliding the UAV that is resting on the landing surface to the desired position. At block 720, a refueling/recharging probe is coupled with the UAV, and at block 725 the UAV is refueled and/or recharged. At block 725, data is transferred to/from the UAV. Such data transfer may be accomplished through wireless connections, or a wired connection that is part of the refueling/recharging probe.

Figure 8:
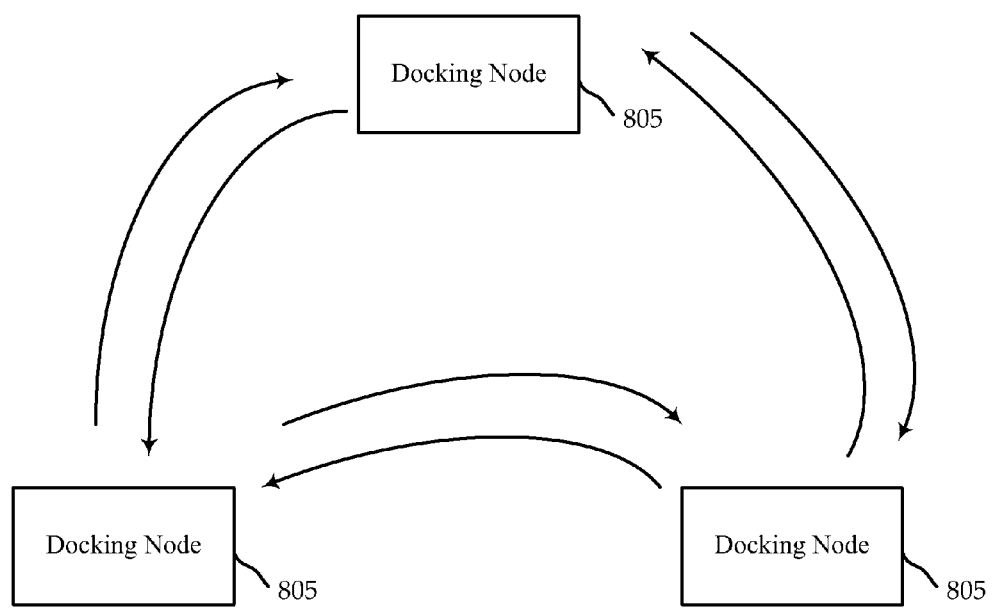
FIG. 8 is a block diagram illustration of a system of autonomous docking nodes used to extend the operating range of UAVs.

With reference now to FIG. 8, a system 800 for extended operations of one or more unmanned aerial vehicles (UAVs) is described. The system of this embodiment includes a number of autonomous docking nodes 805. Each docking node 805, similarly as described above, may include a landing surface, an orientation mechanism coupled with the landing surface to adjust the orientation of the landing surface and provide a level surface, an alignment mechanism on the landing surface that moves a UAV to a predetermined location on the landing surface, and a refueling system associated with the landing surface that is configured to refuel UAVs located on the landing surface. The docking nodes may be dispersed throughout an operational area that is larger than the operating range for one of the UAVs. Thus, a UAV may not be able to traverse the entire operating area and have enough power and/or fuel remaining to return to a starting node. The operating range of the UAVs is extended through use of the multiple docking nodes 805, allowing a UAV to travel from one node to another node, and then return after being recharged and/or refueled. Alternately, the docking nodes may be dispersed throughout an area smaller than the operating range for one of the UAVs to provide redundancy and fault tolerance. Each of the docking nodes 805 may include a wireless transceiver configured to send and receive wireless communications with one or more UAVs, and communicate with a base operations center. Thus, the effective operating range of one or more UAVs may be efficiently and effectively extended without significant additional human resources.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An unmanned aerial vehicle (UAV) docking apparatus, comprising:
a landing surface;
an orientation mechanism coupled with the landing surface configured to adjust the orientation of the landing surface; and
an alignment mechanism coupled with the landing surface, wherein the alignment mechanism comprises two or more sliding wiper arms coupled with the landing surface and configured to slide to contact a UAV resting on the landing surface and push the UAV along the landing surface to a predetermined location on the landing surface,
wherein the landing surface comprises a first side comprising the alignment mechanism, and a second side that comprises one or more photovoltaic cells, and wherein the orientation mechanism is further operable to orient the second side of the landing surface to generate electricity when the UAV is away from the apparatus.

2. The apparatus of claim 1, wherein the orientation mechanism is configured to adjust the landing surface to provide a level surface during UAV landing and take-off.

3. The apparatus of claim 2, wherein the orientation mechanism comprises a level sensor and two or more actuators configured to selectively rotate and tilt the landing surface based on feedback from the level sensor.

4. The apparatus of claim 1, wherein the wipers are interconnected with linear actuators.

5. The apparatus of claim 1, wherein the orientation mechanism and alignment mechanism each comprise pneumatic linear actuators coupled with the landing surface, and wherein the apparatus further comprises: a compressed air system coupled with each of the pneumatic linear actuators.

6. The apparatus of claim 1, further comprising:
a refueling system associated with the landing surface that is configured to interconnect with the UAV.

7. The apparatus of claim 1, further comprising: a data recovery system associated with the landing surface that is connectable in data transfer communication with the UAV.

8. The apparatus of claim 1, further comprising: a latching mechanism coupled with the landing surface that, when the UAV is located in the predetermined position, secures the UAV to the landing surface.

9. A method for docking an unmanned aerial vehicle (UAV), comprising:
positioning a landing surface to provide a level landing area for a UAV;
receiving a signal that the UAV has landed on the landing surface; and
positioning the UAV in a predetermined area on the landing surface, wherein positioning the UAV comprises actuating one or more sliding wiper arms coupled with the landing surface to slide to contact the UAV resting on the landing surface and push the UAV along the landing surface to the predetermined area on the landing surface, wherein the landing surface comprises a first side, the first side configured to position the UAV, and a second side, the second side comprising one or more photovoltaic cells, and wherein the method further comprises orienting the second side of the landing surface to generate electricity when the UAV is away from the landing surface.

10. The method of claim 9, wherein the positioning a landing surface comprises:

receiving a signal from a level sensor indicating an orientation of the landing surface relative to a horizontal plane; and actuating two or more linear actuators configured to selectively rotate and tilt the landing surface based on feedback from the level sensor.

11. The method of claim 9, further comprising: coupling a refueling probe with the UAV; and refueling the UAV.

12. The method of claim 9, further comprising:

receiving data from the UAV.

13. A system for extended operations of one or more unmanned aerial vehicles (UAVs), comprising:

a plurality of autonomous docking nodes each comprising:
a landing surface;
an orientation mechanism coupled with the landing surface configured to adjust the orientation of the landing surface;
an alignment mechanism coupled with the landing surface, wherein the alignment mechanism comprises two or more sliding wiper arms coupled with the landing surface and configured to slide to contact a UAV resting on the landing surface and push the UAV along the landing surface to a predetermined location on the landing surface; and a refueling system associated with the landing surface that is configured to refuel UAVs located on the landing surface, wherein an operating range of the UAVs is extended through use of one or more autonomous docking nodes located remotely from personnel supporting the operation of the UAVs, wherein the landing surface comprises a first side comprising the alignment mechanism, and a second side that comprises one or more photovoltaic cells, and wherein the orientation mechanism is further operable to orient the second side of the landing surface to generate electricity when the UAV is away from the landing surface.

14. The system of claim 13, wherein each of the autonomous docking nodes comprises a wireless transceiver configured to send and receive wireless communications with one or more UAVs.

15. The system of claim 13, wherein the orientation mechanism of the autonomous docking nodes is configured to adjust the landing surface to provide a level surface during UAV landing and take-off.

16. The system of claim 15, wherein the orientation mechanism comprises a level sensor and two or more linear actuators configured to selectively rotate and tilt the landing surface based on feedback from the level sensor.

* * * * *